US011996721B2

(12) United States Patent
Santana

(10) Patent No.: US 11,996,721 B2
(45) Date of Patent: May 28, 2024

(54) MODULAR WIRELESS APPLIANCE CHARGING SYSTEM

(71) Applicant: Daniel Santana, Tampa, FL (US)

(72) Inventor: Daniel Santana, Tampa, FL (US)

( * ) Notice: Subject to any disclaimer, the term of this patent is extended or adjusted under 35 U.S.C. 154(b) by 0 days.

(21) Appl. No.: 18/230,954

(22) Filed: Aug. 7, 2023

(65) Prior Publication Data

US 2023/0378780 A1    Nov. 23, 2023

Related U.S. Application Data

(63) Continuation-in-part of application No. 29/843,030, filed on Jun. 17, 2022, which is a continuation-in-part of application No. 17/524,963, filed on Nov. 12, 2021, now Pat. No. 11,398,739.

(51) Int. Cl.
*H01R 4/58* (2006.01)
*H02J 7/00* (2006.01)
*A45D 27/00* (2006.01)

(52) U.S. Cl.
CPC ............ *H02J 7/0044* (2013.01); *A45D 27/00* (2013.01)

(58) Field of Classification Search
CPC .................................................... H01R 7/0044
USPC .......................................... 439/86, 271, 275
See application file for complete search history.

(56) References Cited

U.S. PATENT DOCUMENTS

| 4,558,270 A * | 12/1985 | Liautaud | ............... H02J 7/0045 |
| | | | 455/90.3 |
| 7,480,138 B2 * | 1/2009 | Kogan | ..................... H04M 1/04 |
| | | | 361/679.02 |
| 2007/0273331 A1 * | 11/2007 | Cross | .................... H02J 7/0044 |
| | | | 15/22.1 |
| 2011/0006732 A1 * | 1/2011 | Li | ......................... H01M 10/46 |
| | | | 320/137 |

* cited by examiner

*Primary Examiner* — Phuong K Dinh
(74) *Attorney, Agent, or Firm* — Anooj Patel; Kevin Schraven; Hankin Patent Law, APC

(57) ABSTRACT

A modular wireless appliance charging system includes a primary charging platform having a plurality of adapter slots disposed on its upper side. An adapter is configured to be removably secured within each adapter slot. Each adapter includes a receiver configured to removably secure an appliance to the adapter via a charging port of the appliance. A power supply is operably connected to a charging mechanism which is configured to charge the battery of the appliance that is secured to the receiver of an adapter that is secured within one of the adapter slots. An auxiliary platform having similar components can be connected to the primary platform to expand the system's charging capacity. The adapters can include many configurations for different types of appliances. In this way, the user can customize their charging system to include a specific type, number, and order of adapters for organizing and charging their battery-powered appliances.

18 Claims, 3 Drawing Sheets

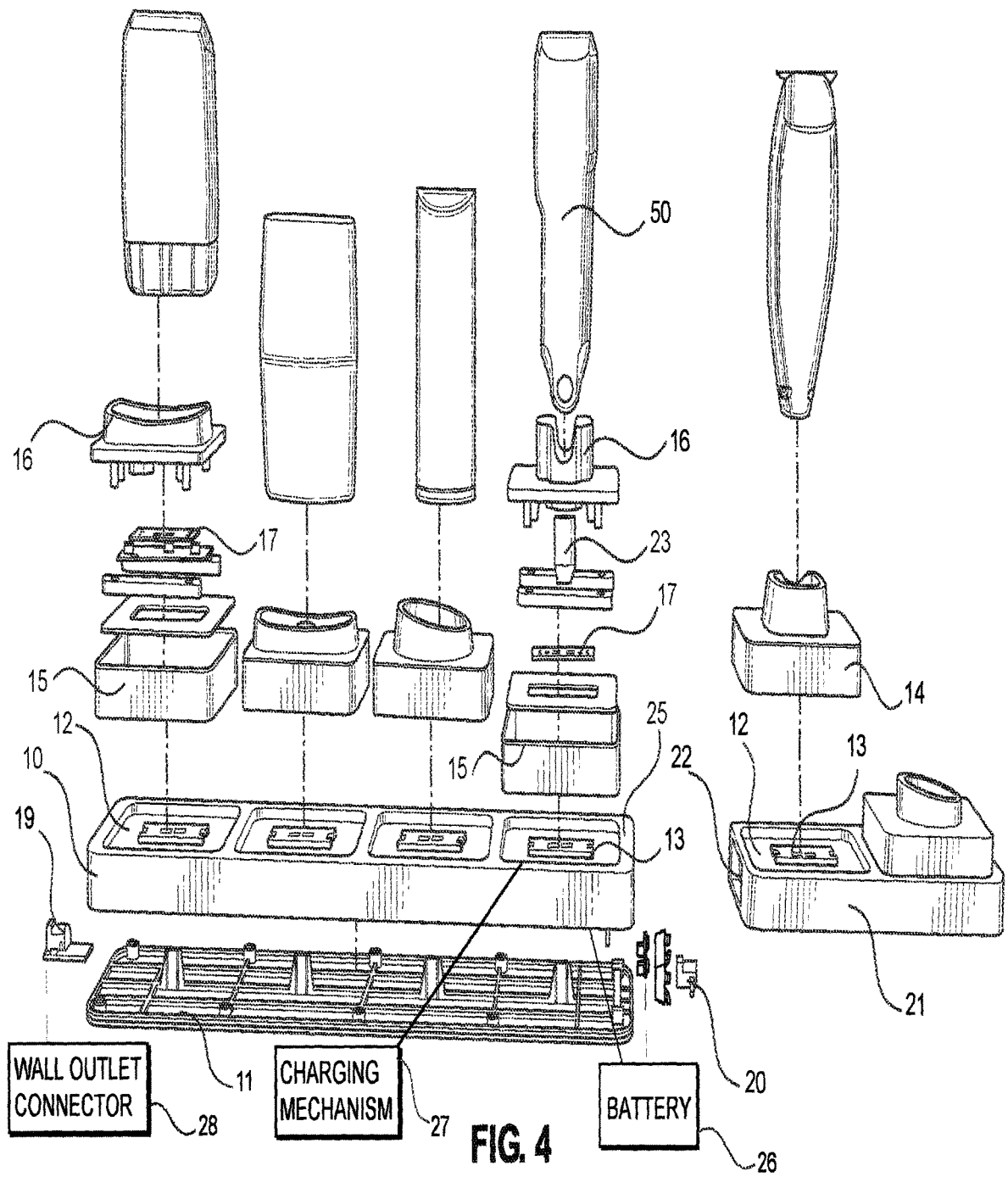

MODULAR WIRELESS APPLIANCE CHARGING SYSTEM

BACKGROUND OF THE INVENTION

The present invention relates to charging platforms for charging battery-powered appliances. More particularly, the present invention provides a modular wireless appliance charging platform that can be customized with different numbers, types, and arrangements of charging adapters for different types of battery-powered appliances. The present invention will be discussed as used in the context of providing a customizable charging solution for battery-powered or "cordless" haircare appliances, but the present invention is not intended to be limited to any particular application.

Hair stylists, barbers, and other hair care professionals often use electrically powered tools while cutting, trimming, and styling their customer's hair. Many different types of clippers, cutters, and other powered appliances can be utilized during a single session. Such appliances can be powered via a cable connecting to a wall outlet. However, many individuals prefer to use battery-powered or "wireless" appliances due to the convenience of not having to maneuver a cord that is usually attached to such appliances. Some battery-powered appliances include a charging cord that must be plugged into a wall outlet for charging. Similar to wall outlet powered devices, these charging cords can lead to a tangled, cluttered mess in the work area. They can also cause problems if the cords become tangled while the devices are being used.

Other types of battery-powered appliances are sold along with a dedicated charging station. The dedicated charging station includes a particular shape and electrical contact arrangement that corresponds to a related electrical contact within the base of the battery-powered appliance. Placing the battery-powered appliance within the receiver of the charging station creates an electrical connection that allows the appliance's battery to be charged. However, since each appliance includes a different connector arrangement and therefore a different contact arrangement for each charging base, this does not solve the general problem of having clutter in the workspace caused by multiple different charging bases each requiring a cord to be plugged into a wall outlet. In view of the above concerns, it is desirable to provide a modular wireless charging system for battery-powered hair care appliances that can effectively charge many types of hair appliances on a compact charging base that can be customized depending on the number and types of hair appliances the individual is using.

Devices have been disclosed in the known art that relate to charging platforms for charging multiple types of battery-powered appliances simultaneously. These include devices that have been patented and disclosed in patent application publications. However, the devices in the known art have several drawbacks. For example, these devices include fixed charging platforms and connectors. They cannot be rearranged to provide a desired arrangement that the individual has in mind. It may be desirable for an individual to organize their hair appliances in the logical order in which they will be used during a hair cutting session, as one example.

Other issues with the devices in the known art occur when an individual purchases a new hair appliance that is not supported by the device. The individual must purchase an appliance that includes another charging cord, or must purchase a new charging solution, which can be time-consuming and costly. The ability to arrange the hair appliances as desired so that they are easily accessible and organized would be beneficial to professional or at-home user alike, and the devices in the known art lack such a feature. Additionally, the ability to customize the particular number of charging adapters in use can enhance the ability to organize appliances and expand as needed when acquiring new appliances.

SUMMARY OF THE INVENTION

The present invention provides a modular wireless appliance charging system wherein the same can be utilized for providing a customizable and expandable for charging solution for battery-powered appliances, such as hair clippers, trimmers, and the like. The modular wireless appliance charging system generally includes a primary charging platform having a plurality of adapter slots disposed on its upper side. The system includes at least one adapter configured to be removably secured within an adapter slot of the plurality of adapter slots, and can include any number of adapters that correspond to different types of appliances. The adapters include a receiver configured to removably secure an appliance to the adapter via a charging port of the appliance. A charging mechanism operably connected to a power supply is configured to charge a battery of the appliance that is secured to the receiver of an adapter that is secured within one of the adapter slots. The system may further include an auxiliary charging platform that is attachable to the primary charging platform. The auxiliary charging platform is similar in form and function to the primary charging platform and provides additional slots for adapters.

One object of the present invention is to provide a modular wireless appliance charging system that allows users to customize the type, number, and arrangement of adapters on the charging platform.

Another object of the present invention is to provide a modular wireless appliance charging system with many different types of adapters, allowing the user to create a customized charging solution with the adapters that match their current appliances, and to expand with new adapters when new appliances are acquired.

A further object of the present invention is to provide a modular wireless appliance charging system that is expandable to provide additional adapter slots for charging additional appliances as the user's collection of appliances increases in number over time.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 4 shows an expanded perspective view of the primary and auxiliary charging platforms from an embodiment of the modular wireless appliance charging system.

DETAILED DESCRIPTION OF THE INVENTION

Figure 1:
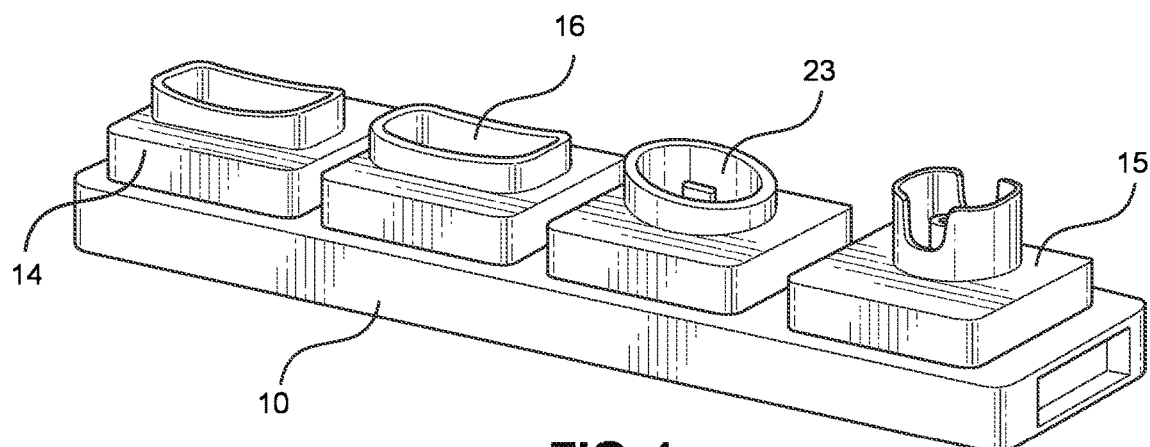
FIG. 1 shows a perspective view of an embodiment of the modular wireless appliance charging system.

Reference is made herein to the attached drawings. Like reference numerals are used throughout the drawings to depict like or similar elements of the modular wireless appliance charging system. For the purposes of presenting a brief and clear description of the present invention, a preferred embodiment will be discussed as used for providing a customizable charging solution for hair appliances and any other suitable types of battery-powered devices. The figures are intended for representative purposes only and should not be considered to be limiting in any respect.

Referring now to FIG. 1, there is shown a perspective view of an embodiment of the modular wireless appliance charging system. The modular wireless appliance charging system includes a primary charging platform 10 which supports a number of adapters 14. Each adapter 14 includes a receiver 16 having a charging port 23, which includes an electrical contact (not visible, shown as 17 in FIG. 4). The receivers 16 are sized to receive different types and sizes of appliances. Additionally, the electrical contacts in connection with the charging port 23 of the adapter 14 are adapted to connect to the corresponding charging port of the appliance so that the primary charging platform 10 can charge the appliance's battery.

The adapters 14 are removably securable within individual adapter slots 12 disposed on an upper surface of the primary charging platform 10. In the shown embodiment, the adapters 14 include a base 15 that aligns to fit snugly within the perimeter walls 18 that define the individual adapter slots 12. The perimeter walls 18 help secure the adapters 14 in place during use. In some embodiments, additional securement mechanisms such as magnets, clips, and other similar devices may be utilized to form a temporary yet secure connection between the adapters 14 and the adapter slots 12.

Each adapter slot 12 includes a charging mechanism in the form of an electrical contact 13 that is operably connected to a power supply. The power supply may be an internal battery within the primary charging platform 10 or a wired connection to a wall outlet. In such an embodiment, the charging platform 10 can include an internal invertor to convert the alternating current from the wall outlet to a direct current required for charging the appliance's battery. When the adapter 14 is secured within the adapter slot 12, the adapter slot electrical contact 13 transmits electrical energy from the power supply to the receiver electrical contact 17. This allows the battery of the appliance secured thereto to be charged.

Figure 2:
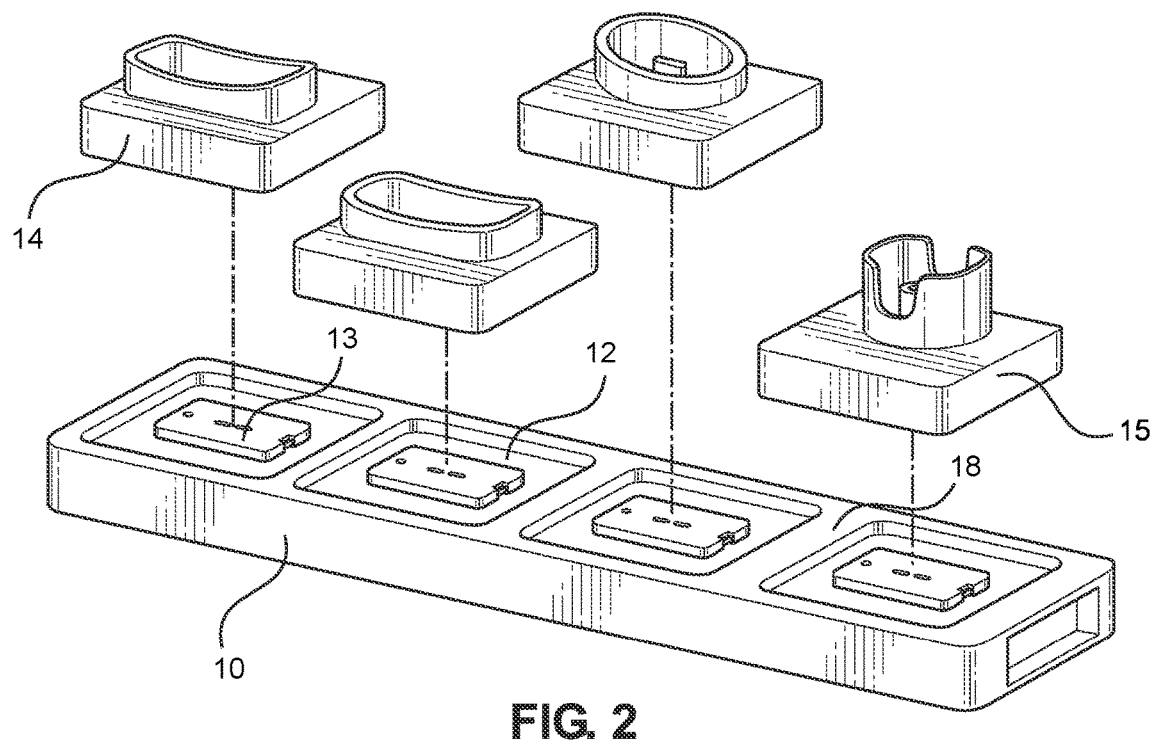
FIG. 2 shows an expanded perspective view of an embodiment of the modular wireless appliance charging system with the adapters separated from the adapter slots.

Referring now to FIG. 2, there is shown an expanded perspective view of an embodiment of the modular wireless appliance charging system with the adapters separated from the adapter slots. The adapter bases 15 and adapter slots 12 all include a common shape and size, so that any adapter 14 can be used in any adapter slot 12. This allows the user to arrange and organize their particular appliances in the pattern they desire. For example, the user may wish to place their appliances from one end of the charging platform 10 to the other in the order that they will be used during the hair cutting or styling process. This can help to streamline the process and improve the experience for both the individual using the appliances and the person whose hair is being cut or styled.

Figure 3:
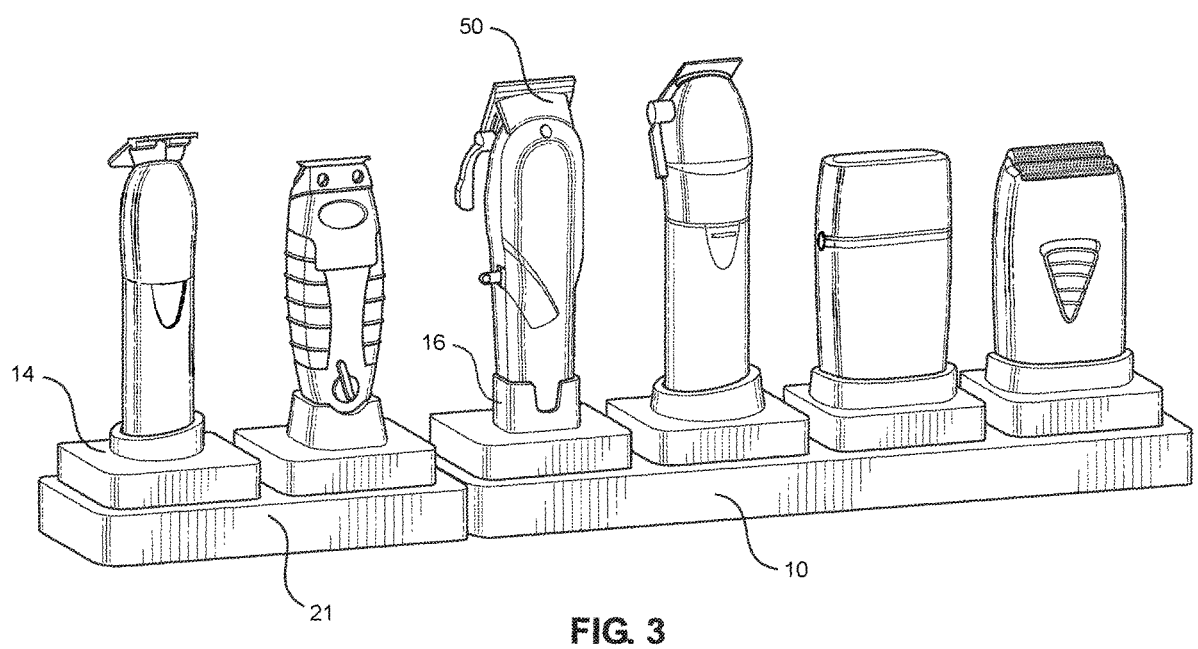
FIG. 3 shows a perspective view of an embodiment of the modular wireless appliance charging system in use with different types of appliances.

Referring now to FIG. 3, there is shown a perspective view of an embodiment of the modular wireless appliance charging system in use with different types of appliances. In some embodiments, the system further includes an auxiliary charging platform 21 that is removably securable to the primary charging platform 10. An electrical connection is formed when the two platforms 10, 21 are secured to one another. In this way, the user can expand the total capacity of the system if needed. Each appliance 50 is secured within its respective receiver 16, since each adapter 14 is designed to match a particular type of appliance.

Referring now to FIG. 4, there is shown an expanded perspective view of the primary and auxiliary charging platforms from an embodiment of the modular wireless appliance charging system. In the shown embodiment, the primary charging platform 10 includes a base plate 11 that includes the power supply and other electronic components of the system. In some embodiments, the power supply includes a battery power supply 26 enclosed within the base plate. A charging port 23 disposed on one end of the primary charging platform 10 is configured to receive electrical energy from the battery power supply. The charging port 23 can include a USB connector or any other suitable electrical connector capable of power transmission. In one embodiment, the charging port 23 connects to the internal battery power supply 26 via the charging mechanism 27 which includes the charging port 23 and an electrical contact 17 within the primary charging platform 10. In other embodiments, the charging port 23 connects to an electrical contact 17 of the charging mechanism 27, which in turn is operably connected to a wall outlet-type power supply 19, which includes a port that receives a wall outlet connector 28 that connects to an external wall outlet as a source of electricity for the wall-outlet type power supply 19. In some embodiments, the wall outlet-type power supply 19 is configured to directly convert the electricity received by the wall outlet-type power supply 19 to the appropriate electrical current required for charging the attached appliances. The primary charging platform's opposing end 25 includes a connector 20 that is configured to removably secure to a corresponding connector 22 on the auxiliary charging platform 21. This allows the same power supply to charge appliances secured to either charging platform, whether it be a battery power supply 26 or a wall outlet-type power supply 19.

Similar to the primary charging platform 10, the auxiliary charging platform 21 includes individual adapter slots 12 with electrical contacts 13, which are sized to receive the base 15 of the adapters 14. In some embodiments, the adapter 14 comprises two electrical contacts, one contact 17 within its base 15, and another contact 23 within the receiver 16. The base electrical contact 17 is in electrical communication with the receiver electrical contact 17, such that electrical energy is transferrable from the power supply to an appliance 50 secured to the adapter 14 when the adapter is secured to one of the adapter slots 12.

In operation, the user can utilize only the primary charging platform 10, or they may attach the auxiliary charging platform 21 to provide additional adapter slots 12. The user can acquire individual adapters 12 that are configured for use with the specific appliances the user owns. This gives the user the ability to expand their charging capabilities as their collection of appliances grows over time. Further, the adapters 12 can be placed in any arrangement on each charging platform, so as to organize the appliances in a way that improves the hair cutting and styling process. In this way, the customization and expansion options of present invention provide improvements over any existing charging platforms and related devices.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, and all equivalent relationships to those illustrated in the drawings and described in the specification are intended to be encompassed by the present invention. Therefore, the foregoing is considered as illustrative only of the principles of the invention. Further, it is not desired to limit the invention to the exact construction and operation shown and described, and accordingly, all suitable modifications and equivalents may be resorted to, falling within the scope of the invention.

What is claimed is:

1. A modular wireless appliance charging system comprising:
    a primary charging platform;
    a plurality of adapter slots disposed on an upper side of the primary charging platform;
    a first adapter;
    a second adapter; and
    a plurality of charging mechanisms;
    wherein at least one of the plurality of charging mechanisms is on an upper side of each of the plurality of adapter slots;
    wherein the first adapter and the second adapter are each configured to be able to matingly engage with each of the plurality of adapter slots;
    wherein the first adapter and the second adapter are configured to be removably secured within at least one adapter slot of the plurality of adapter slots;
    wherein the first adapter comprises a first receiver, a first base, and a first charging port;
    wherein the second adapter comprises a second receiver, a second base, and a second charging port;
    wherein the first receiver is configured to removably secure a first particular appliance to the first adapter;
    wherein the second receiver is configured to removably secure a second particular appliance to the second adapter;
    wherein the first base and the second base are each configured to be able to matingly engage with each of the plurality of adapter slots;
    wherein the first charging port is configured to be able to receive power from each of the plurality of charging mechanisms and provide power to the first particular appliance; and
    wherein the second charging port is configured to be able to receive power from each of the plurality of charging mechanisms and provide power to the second particular appliance.

2. The modular wireless appliance charging system of claim 1, wherein each of the plurality of charging mechanisms comprises a first electrical contact disposed within each of the plurality of adapter slots.

3. The modular wireless appliance charging system of claim 2, wherein each of the plurality of charging mechanisms further comprises a second electrical contact disposed within each adapter which is configured to form an electrical connection with the first electrical contact.

4. The modular wireless appliance charging system of claim 3, wherein each receiver comprises a third electrical contact that is configured to be in electrical communication with the second electrical contact.

5. The modular wireless appliance charging system of claim 1, wherein each of the plurality of charging mechanisms comprises a USB port.

6. A modular wireless appliance charging system comprising:
    a primary charging platform, wherein the primary charging platform comprises:
    one or more adapter slots, wherein each of the one or more adapter slots is configured to have two or more different adapters removably and alternatively secured therein;
    wherein each of the two or more different adapters comprise a base and a receiver, such that there is at least a first receiver and a second receiver;
    wherein each base is the same and is configured to matingly engage with each of the one or more adapter slots;
    wherein the first receiver is configured to receive a first particular appliance;
    wherein the second receiver is configured to receive a second particular appliance;
    wherein each of the two or more adapters includes at least one electric contact configured to supply power to each particular appliance, respectively.

7. The modular wireless appliance charging system of claim 6, wherein each receiver comprises a USB port.

8. The modular wireless appliance charging system of claim 6,
    wherein each of the two or more different adapters further comprises a securement mechanism;
    wherein the securement mechanism is configured to securely and removeably connect the two or more different adapters to the one or more adapter slots.

9. The modular wireless appliance charging system of claim 6, wherein the primary charging platform is configured to have three adapter slots.

10. The modular wireless appliance charging system of claim 6, wherein the primary charging platform comprises a power inlet.

11. The modular wireless appliance charging system of claim 6, wherein each particular appliance is configured to be removably secured to each respective receiver by an appliance charging port.

12. The modular wireless appliance charging system of claim 6, further comprising at least one charging mechanism, wherein the at least one charging mechanism is configured to charge the first and second particular appliances.

13. The modular wireless appliance charging system of claim 12, wherein each of the one or more adapter slots is configured to be operably coupled to one of the at least charging mechanism.

14. The modular wireless appliance charging system of claim 8, wherein the securement mechanism is a clip.

15. A modular wireless appliance charging system comprising:
    a primary charging platform, wherein the primary charging platform comprises:
    a first adapter slot, the first adapter slot is configured to have a first adapter removably secured therein;
    a second adapter slot, the second adapter slot is configured to have a second adapter removably secured therein;

a third adapter slot, the third adapter slot is configured to have a third adapter removably secured therein;

wherein the first, second, and third adapters are different from each other and are selected from a group of adapters;

wherein the first adapter is configured to match a first particular appliance;

wherein the second adapter is configured to match a second particular appliance;

wherein the third adapter is configured to match a third particular appliance;

wherein each adapter of the group of adapters includes a receiver which is configured to accept the respective particular appliance;

wherein each adapter includes at least one electric contact configured to supply power to each respective particular appliance;

wherein each adapter from the group of adapters is configured to be able to matingly engage with any of the adapter slots.

16. The modular wireless appliance charging system of claim 15, wherein the modular wireless appliance charging system is configured to be connected to a power supply via a wall outlet plug.

17. The modular wireless appliance charging system of claim 15, wherein each of the adapter slots is operably coupled to a charging mechanism.

18. The modular wireless appliance charging system of claim 15, wherein each adapter of the group of adapters is configured to be removably secured within the respective adapter slot via a clip.

* * * * *